US011420889B2

(12) United States Patent
Gu et al.

(10) Patent No.: US 11,420,889 B2
(45) Date of Patent: Aug. 23, 2022

(54) ECOLOGICAL REMEDIATION METHOD FOR CONTROLLING SULPHUR POLLUTION INBLACK AND ODOROUS SLUDGE OF RIVERS

(71) Applicant: NANJING INSTITUTE OF GEOGRAPHY & LIMNOLOGY. CHINESE ACADEMY OF SCIENCES, Nanjing (CN)

(72) Inventors: Xiaozhi Gu, Nanjing (CN); Kaining Chen, Nanjing (CN)

(73) Assignee: NANJING INSTITUTE OF GEOGRAPHY, Nanjing (CN)

(*) Notice: Subject to any disclaimer, the term of this patent is extended or adjusted under 35 U.S.C. 154(b) by 0 days.

(21) Appl. No.: 15/436,851

(22) Filed: Feb. 19, 2017

(65) Prior Publication Data
US 2018/0002209 A1     Jan. 4, 2018

(30) Foreign Application Priority Data
Jul. 4, 2016    (CN) .......................... 201610521829.5

(51) Int. Cl.
     *C02F 3/32*          (2006.01)
     *C02F 11/12*        (2019.01)
     (Continued)

(52) U.S. Cl.
     CPC ................ *C02F 3/327* (2013.01); *B09C 1/08* (2013.01); *B09C 1/105* (2013.01); *C02F 1/68* (2013.01);
(Continued)

(58) Field of Classification Search
     CPC ...... C02F 3/327; C02F 1/68; C02F 2101/101; C02F 2303/02; C02F 2103/007;
(Continued)

(56) References Cited

U.S. PATENT DOCUMENTS

| 4,072,016 A * | 2/1978 | Seki | E02F 5/223 |
| | | | 405/266 |
| 5,421,105 A * | 6/1995 | Schulte | E02F 3/963 |
| | | | 405/303 |

(Continued)

*Primary Examiner* — Fred Prince
(74) *Attorney, Agent, or Firm* — PROI Intellectual Property US; Klaus Michael Schmid (57) ABSTRACT

The Invention discloses an ecological remediation method for controlling sulphur pollution in black and odorous sludge of rivers. Firstly, the sludge from pollution layer of the rivers will be dredged and stacked on the banksides with slope protection built along the outer edge of the sludge storage site; then innocent pretreatment will be conducted for the sludge. Specific steps comprise solarization and ploughing, and mixed ameliorant of certain proportion will be added for modification between first solarization and intermittent ploughing. Then, large emergent aquatic plants will be planted on the stacked sludge after pretreatment. The technical method provided by the Invention may control the release of acid-volatile sulfide in the contaminated sludge on one hand and reduce concentration of volatile organic sulfide in the waters on the other hand. With simple technical process and strong operable technology, the Invention meets the current requirements for controlling sulphur pollution in black and odorous sludge of rivers in China and facilitates realizing the goal of long-term control of sulphur pollution in the deposit of the waters.

11 Claims, 9 Drawing Sheets

B. Schematic vertical cross-section graph (51) Int. Cl.
  C02F 11/13    (2019.01)
  C02F 11/14    (2019.01)
  C02F 11/02    (2006.01)
  E02B 3/12     (2006.01)
  B09C 1/08     (2006.01)
  B09C 1/10     (2006.01)
  C02F 1/68     (2006.01)
  E02D 17/20    (2006.01)
  E02F 1/00     (2006.01)
  C02F 11/00    (2006.01)
  C02F 11/131   (2019.01)
  C02F 11/143   (2019.01)
  C02F 11/145   (2019.01)
  C02F 101/10   (2006.01)
  C02F 103/00   (2006.01)

(52) U.S. Cl.
  CPC ............ *C02F 11/02* (2013.01); *C02F 11/12* (2013.01); *C02F 11/131* (2019.01); *C02F 11/143* (2019.01); *C02F 11/145* (2019.01); *E02B 3/128* (2013.01); *E02D 17/207* (2013.01); *E02F 1/00* (2013.01); *B09C 2101/00* (2013.01); *C02F 11/00* (2013.01); *C02F 2101/101* (2013.01); *C02F 2103/007* (2013.01); *C02F 2303/02* (2013.01); *E02D 2300/0071* (2013.01); *Y02W 10/10* (2015.05)

(58) Field of Classification Search
  CPC ... E02F 1/00; B09C 1/105; B09C 1/08; B09C 2101/00; E02D 17/207; E02D 2300/0071; Y02A 20/402
  USPC ....... 210/602, 631, 747.4, 747.5, 170.1, 916
  See application file for complete search history.

(56) References Cited

U.S. PATENT DOCUMENTS

| | | | | |
|---|---|---|---|---|
| 5,481,815 | A * | 1/1996 | Murphy | C05F 17/80 37/344 |
| 6,395,174 | B1 * | 5/2002 | Teran | A01K 1/0103 210/605 |
| 2004/0255513 | A1 * | 12/2004 | Becker | A01G 31/00 47/65.9 |
| 2009/0069181 | A1 * | 3/2009 | Boulos | C02F 1/722 504/151 |
| 2013/0306555 | A1 * | 11/2013 | Chattopadhyay | C02F 3/104 210/616 |

* cited by examiner

A. Schematic local layout graph

FIG. 26

B. Schematic vertical cross-section graph

ECOLOGICAL REMEDIATION METHOD FOR CONTROLLING SULPHUR POLLUTION INBLACK AND ODOROUS SLUDGE OF RIVERS

FIELD OF THE INVENTION

The Invention belongs to the field of environmental protection technology and relates to a remediation method for severe eutrophic water of heavily polluted rivers in cities, and particularly to an in-situ remediation method for acid-volatile sulfide and water-volatile sulfide pollution in heavily contaminated black and odorous sludge of rivers.

BACKGROUND OF THE INVENTION

As a key part of lacustrine ecosystem, sludge not only provides an important living place for aquatic plants and benthos, but also an important reservoir for pollutants. The sulfide in the sludge is generated during the process of dissimilatory reduction of sulfate, or the process of microorganism decomposing and using sulphur-containing amino acid in organic materials as biological metabolites and remnants; the content of which is a key index for assessing the sludge environment quality. Under certain conditions, the sulfide in the sludge can enter the waters by releasing and water convection. Concentration of the pollutants in the sludge is an indirect indicator of the contamination degree of rivers. Therefore, the pollution status of the sludge is a key factor for overall assessing the water quality, while the content of sulfide is a key index forassessing the sludge environment quality. Occurrence of sulfide in the sludge causes the water to become black and odorous, threatening the aquatic organism and generating endogenous pollution under certain conditions.

At present, most of theblack and odorous rivers in urban and rural areas of China are caused by sulfocompound in the sludge. The blackening and stink of water is mainly caused bythe urban sludge and sullage-water interface in a hypoxia reduction state; the organic substances cause greater oxygen consumption than reoxygenation during decomposition and thus create an oxygen-deficient environment; abundant smelly gases as methane, hydrogen sulfide and ammonia resulting from organic substance decomposition by anaerobe escape out of the water, making the water to become black and odorous. In addition to blacken the water and release the rotten egg smell of $H_2S$, sulfide also has serious threat to the aquatic organism and the activity of aquatic plants may be severely influenced with a concentration of 10 $\mu mol L^{-1} S^{2-}$. Acid-volatile sulfide (AVS) is a kind of sulphur in the deposit released in a form of $H_2S$ because it can react with the acid. The content of AVS may indicate the redox characteristic of the deposit. In the deposit environment with reducibility, the high content of AVS may indicate that the deposit has strong reducibility and the aquatic organism is hard to survive. As a phytotoxin, sulfide inhibits plant root from growing and makes it rotted, and finally the plants will wither. For its own toxicity and reducibility, sulfide is noxious to fishes and aquatic organisms.

Currently, the controlling of sludge pollution is mainly focused on disposal of nitrogen and phosphor pollution in the sludge. The technology for sulfide pollution treatment is relatively deficient. It mostly uses the emergency disposal methods as dosing chemical reagent. For example, Patent CN102424446A records that the mixture of zeolite powder, active carbon, oxygenates, flocculants and adhesive is used to control the blackened and stinky river. Upon remediation, the condition of black and odorous water uprisen with black mud in summer will be obviously alleviated or eliminated. For another example, Patent CN103172228B uses the technology of preparing activated sludge by adding active microbial agents. This technology mainly aims at controlling the nitrogen and phosphorus pollutants in the waters or the sludge, and roughly puts forwards the technology for disposal of the AVS in the sludge; however, the technology for further eliminating volatile sulfides in the deposit as dimethyl sulfide (DMS), dimethyl disulfide (DMDS), dimethyl trisulfide (DMTS), methanthiol (MTL) and $H_2S$ have not been reported.

SUMMARY OF THE INVENTION

The Invention aims at providing an ecological remediation method for controlling sulphur pollution in black and odorous sludge of rivers. Said method can be used in the rivers with severesludge pollution, seriously degraded and even completely disappeared vegetation along the riparian zone, vertical cement bankside zone along the riparian zone that needs ecological embankment. With the Invention, the above problems of water quality, sludge quality and ecological embankment of the vertical cement bankside zone along the riparian zone can be solved synchronously and the goal of comprehensive treatment can be achieved synchronously.

To achieve the above goal, the Invention uses the technical scheme as an ecological remediation method for controlling sulphur pollution in black and odorous sludge of rivers, comprising:

Step 1: Determining the optimal dredging depth of the black and odorous sludge in the middle of the riverbed; dredging the contaminated sludge and stacking it on both banksides of the river; building a gentle slope with slope protection and slope toe reinforcement along the riparian zone;

Step 2: Pre-treatment of contaminated sludge on gentle slope of the banksides: stacking the sludge on the banksides for solarization and ploughing the surface layer of the sludge during this period; spraying a compound ameliorant into the sludge during ploughing; said compound ameliorant is a mixer of slaked lime and iron-ore slag;

Step 3: Planting large aquatic vascular plant communities on the banksides after pre-treatment of the contaminated sludge on the gentle slope.

The above ecological remediation method for controlling sulphur pollution in black and odorous sludge of rivers, wherein, said method for determining the dredging depth of the sludge as described in Step 1 is to determine the sludge ploughing depth based on a technical principle combining the release rate of nitrogen and phosphorus from the sludge and hierarchical control of heavy metal pollution. The specific method is as follows: firstly, collecting the in-situ sludge with a columnar sludge sampler of gravity type dividing the columnar sludge into several layers from the surficial deposit to the bottom to obtain the vertical distribution information of the pollutants in the sludge, ranking risks for the sulfide content in different soil layers of the surficial deposit and the sulfide emission flux level of sludge-aqueous interface, and determining the optimal dredging depth of the sludge based on the technical principle of hierarchical control of sulphur pollution in the sludge.

The above ecological remediation method for controlling sulphur pollution in black and odorous sludge of rivers, wherein, as for dredging the contaminated sludge and stacking it on both banksides of the river as described in Step 1, the stacking width of the sludge along the riparian zone is 10-20% of the total river width.

The above ecological remediation method for controlling sulphur pollution in black and odorous sludge of rivers, wherein, as for building a gentle slope with slope protection and slope toe reinforcement along the riparian zone as described in Step 1, the method is to build a gentle slope with the stacked sludge in a natural sloping proportion of 1:3-1:5 and reinforce the slope toe along the extension of the stacked sludge with timber piles; said pile is a cedar pile of 5 m long with a rhizome of 12-15 cm (i.e., the end with larger diameter) and a top diameter of 8-10 cm (i.e., the end with smaller diameter), which is pegged one after another. The upper end of the cedar pile is 1-2.5 m higher than the basal elevation of the extension slope toe of the newly stacked slope; the top of the pile is flat with the normal water level of the river; the basal elevation of the stacked gentle slope will be controlled within 1.2 m of the water depth.

The above ecological remediation method for controlling sulphur pollution in black and odorous sludge of rivers, wherein, the time for solarization as described in Step 2 is 5-10 days.

The above ecological remediation method for controlling sulphur pollution in black and odorous sludge of rivers, wherein, ploughing the surface layer of the sludge as described in Step 2 will be conducted for 2-3 times with a ploughing depth of more than 20 cm; the ploughing is conducted 48 h after solarization for the first time and repeated at an interval of 24 h then. When the ploughing depth is more than 20 cm, the surficial deposit can be adequately oxidized. This depth is a part where the root system of plants mainly gathers, which can create an enabling environment for subsequent root remediation and growth of plants.

The above ecological remediation method for controlling sulphur pollution in black and odorous sludge of rivers, wherein, said compound ameliorant as described in Step 2 is a powder of 20-100 meshes; the mass ratio of the compound ameliorant added into the deposit is 1000:0.2-25:0.5-50, preferably 1000:0.2-0.8:10-35, of sludge deposit:slaked lime:smashed iron-ore slag. In consideration of the high moisture content of the deposit after initial dredging, the time for adding the compound ameliorant is 48 h after solarization. Meanwhile, the ameliorant is added for many times with a small amount each time so that it can be uniformly mixed with the sludge.

The above ecological remediation method for controlling sulphur pollution in black and odorous sludge of rivers, wherein, the large aquatic vascular plant community as described in Step 3 comprises *Phragmitesaustralis* (Cav.) Trin. exSteud, *Typhaorientalis* Presl. and *Thaliadealbata* Link; the planting density of *Phragmitesaustralis* (Cav.) Trin. exSteud is 5-8 strains/m$^2$, *Typhaorientalis* Presl. 3-5 strains/m$^2$ and *Thaliadealbata* Link 3-5 strains/m$^2$, which finally forms a large emergent aquatic plant community with a vegetation fraction of more than 60%.

The advantages of the Invention are as follows:

(1) The technical process involved in the Invention is simple with strong operability and can be applied to ecological remediation for common rivers.

(2) The technical links involved in the pre-treatment technology of deposit such as sludge ploughing, solarization and ameliorant adding are all conducted in-situ without occupying additional land space, involving the links as deposit transport or resulting secondary pollution for the waters. The disposal of deposit can be conducted within a short period and take effect quickly. In-situ phytoremediation can be achieved at once upon pre-treatment of deposit and the goal of water pollution remediation can be realized in the current year.

(3) The remediation materials involved in the Invention such as iron-ore slag, slaked lime, *Phragmitesaustralis* (Cav.) Trin. exSteud and *Typhaorientalis* Presl. are all eco-friendly materials with low price and wide source, which are suitable for being applied to and promoted in the ecological engineering practice for river control.

(4) With the coupling technology of chemical fixation and bioremediation, the Invention meets the current requirements for controlling sulphur pollution in black and odorous sludge of rivers in China and facilitates realizing the goal of long-term control of sulphur pollution in the deposit of the waters.

The technical progresses of the Invention are as follows:

(1) The volatile sulfide of the deposit involved in the Invention is easily oxidized and volatilized; therefore, the self-regulating function of ecosystem is taken full consideration in designing the technical scheme so as to reduce the artificial interfering frequency and intensity. The technical superiority lies in that a condition of high-efficient natural reoxygenation of deposit is created so that most components of volatile sulfide in the deposit can be firstly removed through natural reoxygenation and oxidization of surficial deposit and promotion of volatilization. The first removal rate of the Invention is more than 60%, meeting the requirements of plants growth for deposit ecological remediation of common rivers. Then, the deposit ameliorant is added to assist with the comprehensive disposal measures as chemical passivation, oxidization, and radial oxygen loss and radicular system absorption of large aquatic plants to achieve the goal of in-situ conversion and elimination of residual sulfides.

(2) The technical scheme provided by the Invention may conduct long-term remediation of the sulfide pollution in black and odorous sludge. After pre-treatment of the deposit, the main stress factors of plant growth is removed or reduced. Then, through distributed implementation of the long-term measures for in-situ conversion of sulfide by direct recovery of large emergent aquatic plant in the pollution layer of severe sulphur pollution, emergency disposal with deposit ameliorant and plant remediation, the goals of emergency disposal and long-term control of stinky sulphur pollution of deposit are achieved synchronously.

(3) Taking full advantages of self-regulating function of river's ecosystem, the Invention improves the physico-chemical properties of the deposit and realizes virtuous circle of aquatic ecosystem along the riparian zone by regulating the internal component structure of the ecosystem.

BRIEF DESCRIPTION OF THE DRAWINGS

Marks in the figures: 1. river under control; 2. newly constructed gentle slope; 3. emergent aquatic plant; 4. bamboo fence; 5. timber pile; 6. route for constructing bank slope with sludge from the center.

DETAILED DESCRIPTION OF THE PREFERRED EMBODIMENTS

The technical scheme of the Invention is further described in combination with Embodiments and Drawings as follows. The protection scope of the Invention is not limited by the Embodiments but the Claims.

Embodiment 1

A certain river in Jiaxing, Zhejiang, of which the thickness of black and odorous sludge is about 30 cm on average, is conducted with ecological remediation according to the Invention. The embodiment is as follows:

1) Sludge dredging. To dredge the contaminated deposit of the river, firstly, measure the vertical distribution characteristics on profile of the sulfide in the surficial deposit; analyze the release of sulphur for rating and ensure that the optimal depth for sludge ploughing in the middle sedimentation area of the riverbed is 40 cm based on the technical principle of hierarchical control of sulfide and the tenet of analyzing comprehensive cost-effectiveness and sulfide pollution as per classification. Then, stack the dredged contaminated sludge on both sides of the river with a dredger; the stacking width along the riparian zone is 10% of the total width of river bank. Build a gentle slope along the riparian zone with the stacked sludge in a natural sloping proportion of 1:3 and peg cedar piles along the extension of the stacked sludge for slope protection. Peg 6-7 cedar piles with a top diameter of 8 cm and a rhizome of 15 cm one after another per meter for slope protection. The buried depth of the pile is 2.5 m. The top of the pile is flat with the normal water level of the river. The basal elevation of the stacked gentle slope is controlled within 0.8 m of the water depth.

2) Pre-treatment of gentle slope sludge. Solarization of the gentle slope sludge will be conducted for 7 days in total. Plough the surficial sludge with a depth of 30 cm 48 h after solarization for the first time and repeat ploughing at an interval of 24 h then. Add a compound ameliorant for deposit into the sludge during the first ploughing. The ameliorant is a mixer of slaked lime and iron-ore slag. Smash the mixture and use the particles of 60 meshes. The mass ratio of the compound ameliorant added into the deposit is 1000:0.2:15 of sludge deposit:slaked lime: smashed iron-ore slag.

3) Recover the emergent aquatic plant community on the surficial sludge after pre-treatment. Plant the subterraneous stem or balled seedling of *Phragmitesaustralis* (Cav.) Trin. exSteud and *Thaliadealbata* Link along the riparian zone for vegetation recovery in April or May with a planting density of 8 strains/m$^2$ for *Phragmitesaustralis* (Cav.) Trin. exSteud and 3 strains/m$^2$ for *Thaliadealbata* Link. The cover degree of the emergent aquatic plant on the newly built gentle slope will reach 70% in the next year.

Figure 25:
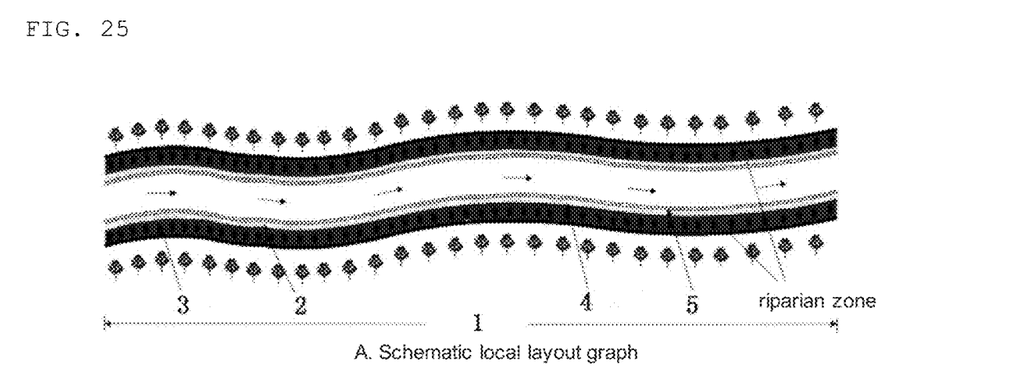
FIG. 25 is a plane layout structural diagram of the riparian zone constructed according to the method of the Invention.
Figure 26:
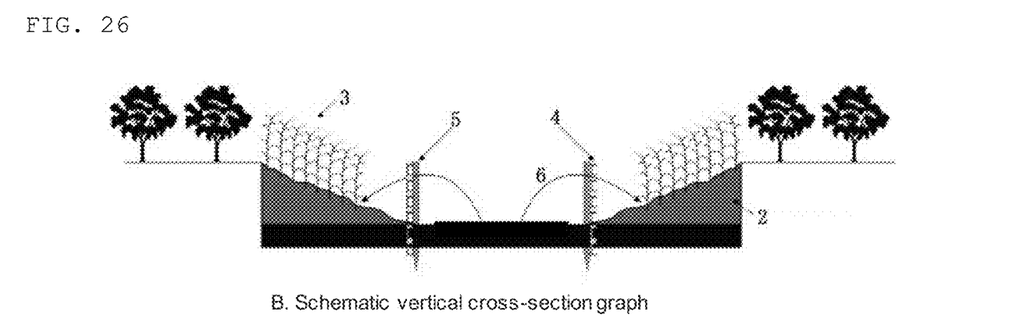
FIG. 26 is a sectional layout structural diagram of the riparian zone constructed according to the method of the Invention.

The plane layout structure diagram and sectional layout structure diagram of the riparian zone constructed according to the above method are shown in FIGS. 25 and 26 respectively.

Figure 1:
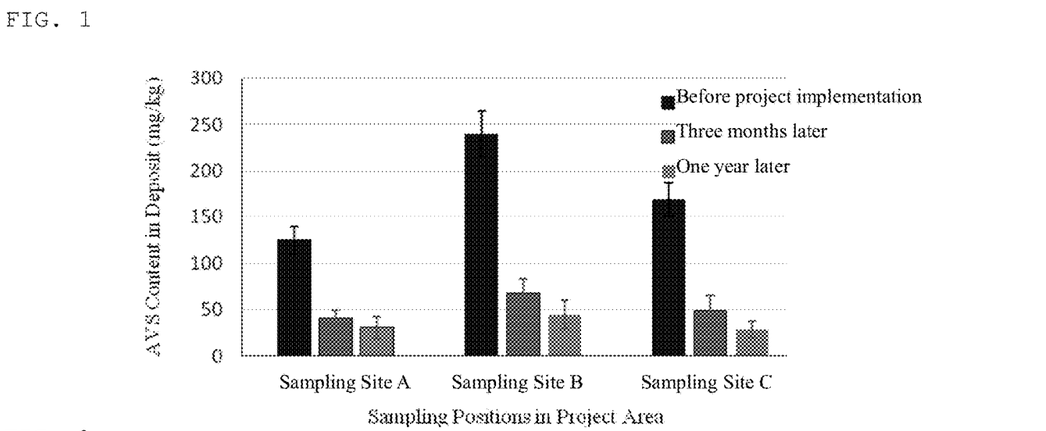
FIG. 1 is a dynamic schematic diagram of the sulfide in the sludge before and after the ecological remediation works of black and odorous sludge of Embodiment 1 is implemented.
Figure 2:
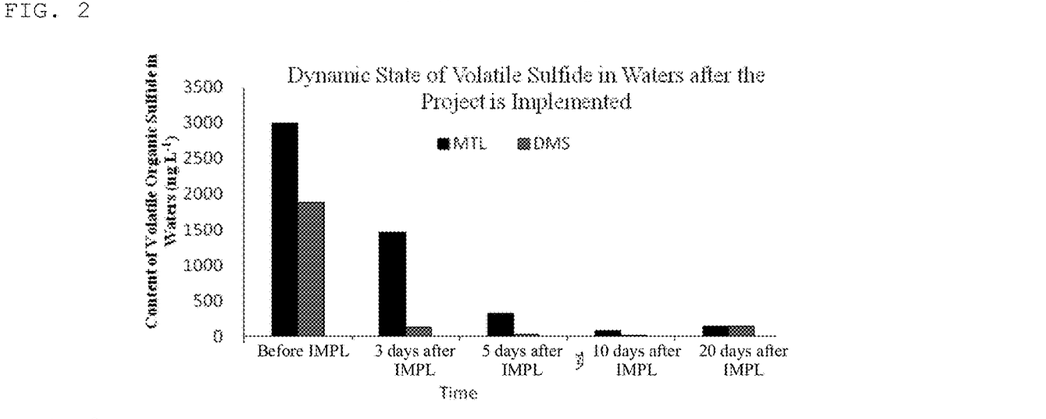
FIG. 2 is a dynamic schematic diagram of the volatile sulfide in the waters after the works of Embodiment 1 is implemented.
Figure 3:
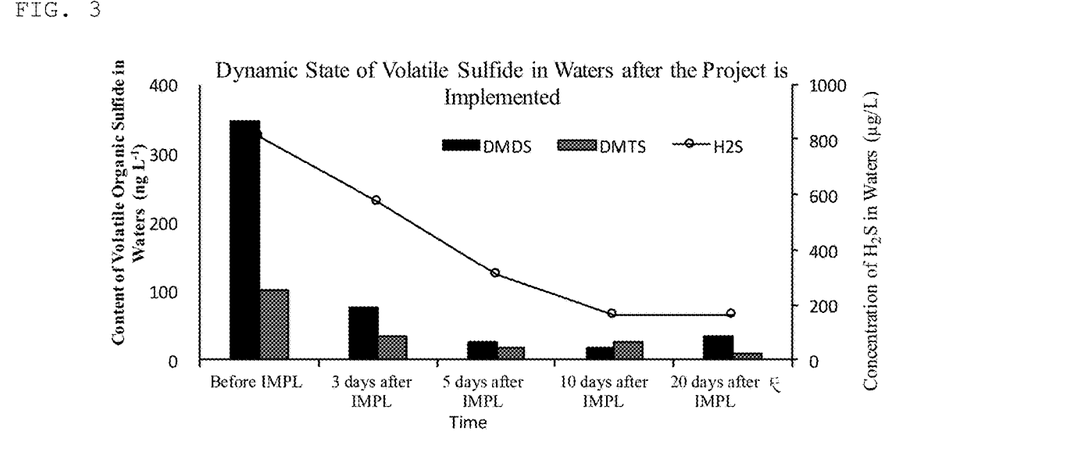
FIG. 3 is a dynamic schematic diagram of the volatile sulfide in the waters after the works of Embodiment 1 is implemented.

As shown in FIGS. 1-3, after continuous monitoring of the sulfide in the sludge after completion of the ecological project, the content of acid volatile sulfide (AVS) is found declined obviously. Three months later, the content of AVS in the sludge is declined by 67-72% (69% on average) compared with the contrast area; one year later, the content of AVS in the sludge is declined by 75-83% (79% on average) compared with the contrast area. The removal rate of volatile sulfides in the waters as dimethyl sulfide (DMS), dimethyl disulfide (DMDS), dimethyl trisulfide (DMTS), methanthiol (MTL) and hydrogen sulfide ($H_2S$) is 80-95%. The stink of water is eliminated and the water quality is greatly improved.

Embodiment 2

A certain river in Jiaxing, Zhejiang, of which the thickness of black and odorous sludge is about 20 cm on average, is conducted with ecological remediation according to the Invention. The embodiment is as follows:

1) Sludge dredging. To dredge the contaminated deposit of the river, firstly, measure the vertical distribution characteristics on profile of the sulfide in the surficial deposit; analyze the release of sulphur for rating and ensure that the optimal depth for sludge ploughing in the middle sedimentation area of the riverbed is 20 cm based on the technical principle of hierarchical control of sulfide and the tenet of analyzing comprehensive cost-effectiveness and sulfide pollution as per classification. Then, stack the dredged contaminated sludge on both sides of the river with a dredger; the stacking width along the riparian zone is 15% of the total width of river bank. with the stacked sludge in a natural sloping proportion of 1:5 and peg cedar piles along the extension of the stacked sludge for slope protection. Peg 6-7 cedar piles with a top diameter of 9 cm and a rhizome of 13 cm one after another per meter for slope protection. The buried depth of the pile is 2.5 m. The top of the pile is flat with the normal water level of the river. The basal elevation of the stacked gentle slope is controlled within 0.8 m of the water depth.

2) Pre-treatment of gentle slope sludge. Solarization of the gentle slope sludge will be conducted for 5 days in total. Plough the surficial sludge of 20 cm depth 48 h after solarization for the first time and repeat ploughing at an interval of 24 h then. Add a compound ameliorant for deposit into the sludge during the first ploughing. The ameliorant is a mixer of slaked lime and iron-ore slag. Smash the mixture and use the particles of 60 meshes. The mass ratio of the compound ameliorant added into the deposit is 1000:0.6:10 of sludge deposit:slaked lime:smashed iron-ore slag. Because the content of sulfide in the deposit will be different among different areas of the river, the adding amount will be adjusted accordingly for the deposit with different properties.

3) Recover the emergent aquatic plant community on the surficial sludge after pre-treatment. Plant the subterraneous stem or balled seedling of *Phragmitesaustralis* (Cav.) Trin. exSteud and *Thaliadealbata* Link along the riparian zone for vegetation recovery in April or May with a planting density of 6 strains/$m^2$ for *Phragmitesaustralis* (Cav.) Trin. exSteud and 5 strains/$m^2$ for *Thaliadealbata* Link. The cover degree of the emergent aquatic plant on the newly built gentle slope will reach 65% in the next year.

The plane layout structure diagram and sectional layout structure diagram of the riparian zone constructed according to the above method are shown in FIGS. 25 and 26 respectively.

Figure 4:
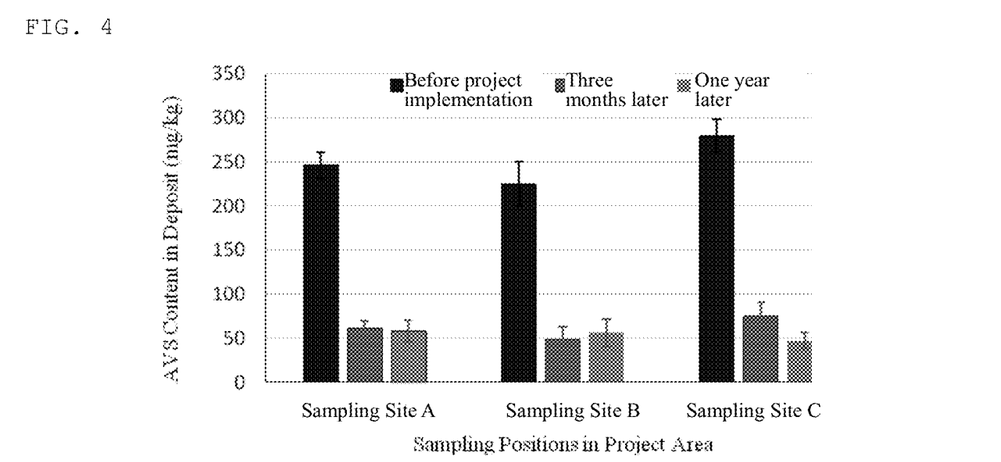
FIG. 4 is a dynamic schematic diagram of the sulfide in the sludge before and after the ecological remediation works of black and odorous sludge of Embodiment 2 is implemented.
Figure 5:
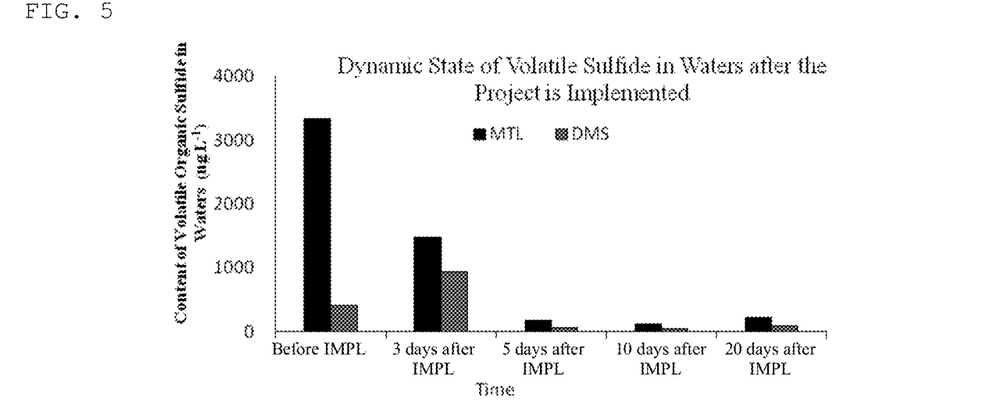
FIG. 5 is a dynamic schematic diagram of the volatile sulfide in the waters after the works of Embodiment 2 is implemented.
Figure 6:
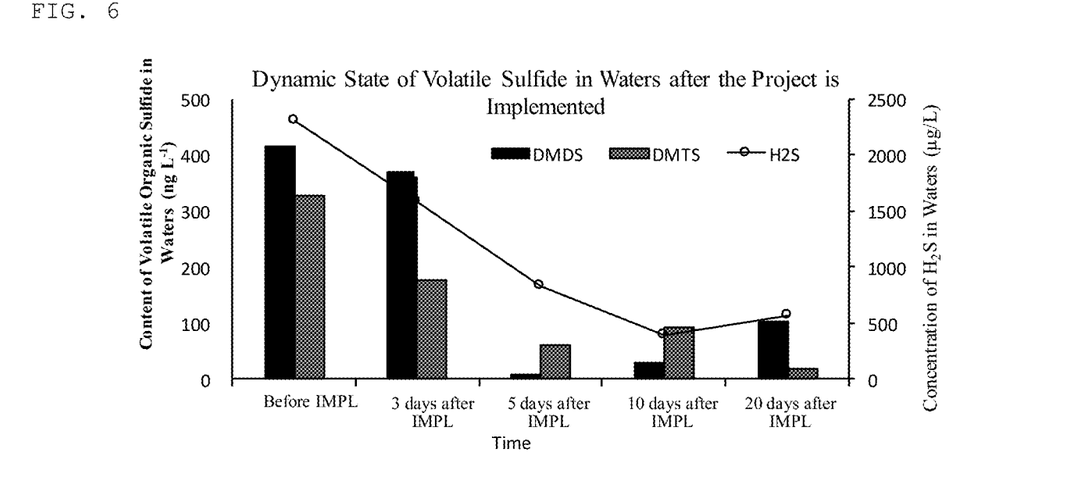
FIG. 6 is a dynamic schematic diagram of the volatile sulfide in the waters after the works of Embodiment 2 is implemented.

As shown in FIGS. 4-6, through continuous monitoring of the sulfide in the sludge after completion of the ecological project, the content of acid volatile sulfide (AVS) is found declined obviously. Three months later, the content of AVS in the sludge is declined by 73-78% (76% on average) compared with the contrast area; one year later, the content of AVS in the sludge is declined by 75-83% (78% on average) compared with the contrast area. The removal rate of volatile sulfides in the waters as dimethyl sulfide (DMS), dimethyl disulfide (DMDS), dimethyl trisulfide (DMTS), methanthiol (MTL) and hydrogen sulfide ($H_2S$) is 75-94%. The stink of water is eliminated and the water quality is greatly improved.

Embodiment 3

A certain river in Changzhou, Jiangsu, of which the thickness of black and odorous sludge is about 30 cm on average, is conducted with ecological remediation according to the Invention. The embodiment is as follows:

1) Sludge dredging. To dredge the contaminated deposit of the river, firstly, measure the vertical distribution characteristics on profile of the sulfide in the surficial deposit; analyze the release of sulphur for rating and ensure that the optimal depth for sludge ploughing in the middle sedimentation area of the riverbed is 30 cm based on the technical principle of hierarchical control of sulfide and the tenet of analyzing comprehensive cost-effectiveness and sulfide pollution as per classification. Then, stack the dredged contaminated sludge on both sides of the river with a dredger; the stacking width along the riparian zone is 20% of the total width of river bank with the stacked sludge in a natural sloping proportion of 1:4 and peg cedar piles along the extension of the stacked sludge for slope protection. Peg 6-7 cedar piles with a top diameter of 10 cm and a rhizome of 14 cm one after another per meter for slope protection. The buried depth of the pile is 2.5 m. The top of the pile is flat with the normal water level of the river. The basal elevation of the stacked gentle slope is controlled within 0.9 m of the water depth.

2) Pre-treatment of gentle slope sludge. Solarization of the gentle slope sludge will be conducted for 10 days in total. Plough the surficial sludge of 30 cm depth 48 h after solarization for the first time and repeat ploughing at an interval of 24 h then. Add a compound ameliorant for deposit into the sludge during the first ploughing. The ameliorant is a mixer of slaked lime and iron-ore slag. Smash the mixture and use the particles of 20 meshes. The mass ratio of the compound ameliorant added into the deposit is 1000:0.8:0.5 of sludge deposit:slaked lime:smashed iron-ore slag. Because the content of sulfide in the deposit will be different among different areas of the river, the adding amount will be adjusted accordingly for the deposit with different properties.

3) Recover the emergent aquatic plant community on the surficial sludge after pre-treatment. Plant the subterraneous stem or balled seedling of *Phragmitesaustralis* (Cav.) Trin. exSteud and *Thaliadealbata* Link along the riparian zone for vegetation recovery in April or May with a planting density of 5 strains/$m^2$ for *Phragmitesaustralis* (Cav.) Trin. exSteud and 4 strains/$m^2$ for *Thaliadealbata* Link. The cover degree of the emergent aquatic plant on the newly built gentle slope will reach 60% in the next year.

The plane layout structure diagram and sectional layout structure diagram of the riparian zone constructed according to the above method are shown in FIGS. 25 and 26 respectively.

Figure 7:
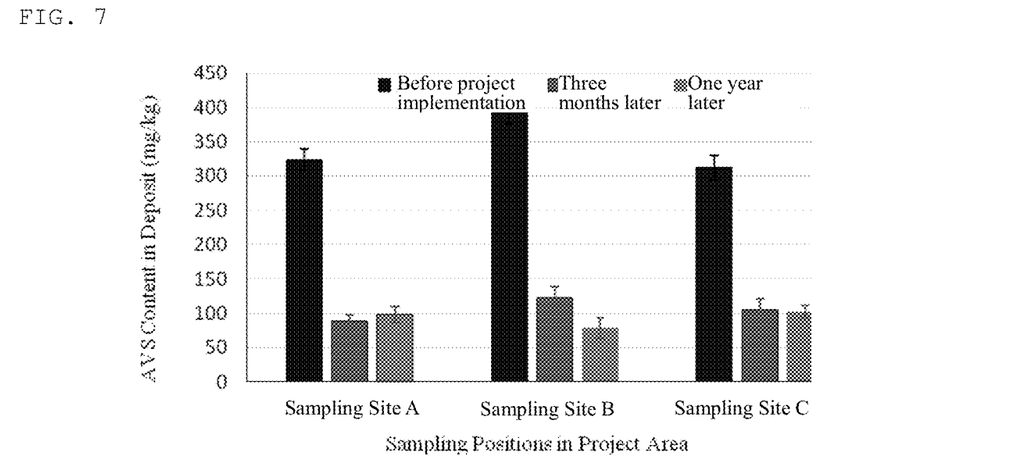
FIG. 7 is a dynamic schematic diagram of the sulfide in the sludge before and after the ecological remediation works of black and odorous sludge of Embodiment 3 is implemented.
Figure 8:
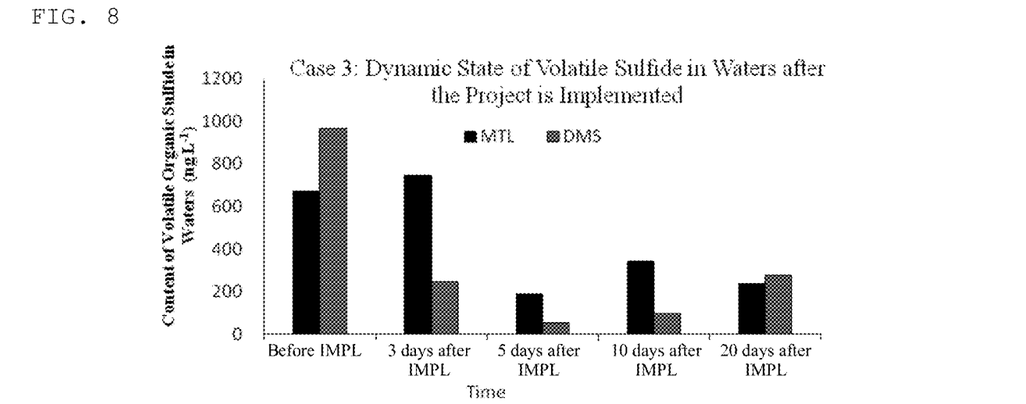
FIG. 8 is a dynamic schematic diagram of the volatile sulfide in the waters after the works of Embodiment 3 is implemented.
Figure 9:
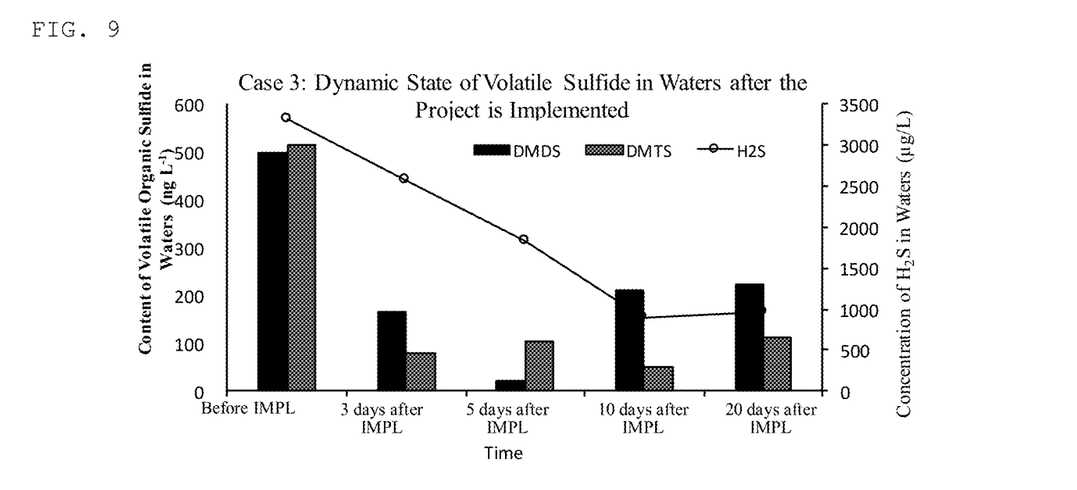
FIG. 9 is a dynamic schematic diagram of the volatile sulfide in the waters after the works of Embodiment 3 is implemented.

As shown in FIGS. 7-9, through continuous monitoring of the sulfide in the sludge after completion of the ecological project, the content of acid volatile sulfide (AVS) is found declined obviously. Three months later, the content of AVS in the sludge is declined by 66-73% (69% on average) compared with the contrast area; one year later, the content of AVS in the sludge is declined by 69-80% (73% on average) compared with the contrast area. The removal rate of volatile sulfides in the waters as dimethyl sulfide (DMS), dimethyl disulfide (DMDS), dimethyl trisulfide (DMTS), methanthiol (MTL) and hydrogen sulfide ($H_2S$) is 55-78%. The stink of water is eliminated effectively and the water quality is greatly improved.

Embodiment 4

A certain river in Changzhou, Jiangsu, of which the thickness of black and odorous sludge is about 30 cm on average, is conducted with ecological remediation according the Invention. The embodiment is as follows:

1) Sludge dredging. To dredge the contaminated deposit of the river, firstly, measure the vertical distribution characteristics on profile of the sulfide in the surficial deposit; analyze the release of sulphur for rating and ensure that the optimal depth for sludge ploughing in the middle sedimentation area of the riverbed is 25 cm based on the technical principle of hierarchical control of sulfide and the tenet of analyzing comprehensive cost-effectiveness and sulfide pollution as per classification. Then, stack the dredged contaminated sludge on both sides of the river with a dredger; the stacking width along the riparian zone is 15% of the total width of river bank. with the stacked sludge in a natural sloping proportion of 1:3 and peg cedar piles along the extension of the stacked sludge for slope protection. Peg 6-7 cedar piles with a top diameter of 9 cm and a rhizome of 15 cm one after another per meter for slope protection. The buried depth of the pile is 2.5 m. The top of the pile is flat with the normal water level of the river. The basal elevation of the stacked gentle slope is controlled within 1 m of the water depth.

2) Pre-treatment of gentle slope sludge. Solarization of the gentle slope sludge will be conducted for 8 days in total. Plough the surficial sludge of 25 cm depth 48 h after solarization for the first time and repeat ploughing at an interval of 24 h then. Add a compound ameliorant for deposit into the sludge during the first ploughing. The ameliorant is a mixer of slaked lime and iron-ore slag. Smash the mixture and use the particles of 100 meshes. The mass ratio of the compound ameliorant added into the deposit is 1000:2:5 of sludge deposit:slaked lime:smashed iron-ore slag. Because the content of sulfide in the deposit will be different among different areas of the river, the adding amount will be adjusted accordingly for the deposit with different properties.

3) Recover the emergent aquatic plant community on the surficial sludge after pre-treatment. Plant the subterraneous stem or balled seedling of *Phragmitesaustralis* (Cav.) Trin. exSteud and *Thaliadealbata* Link along the riparian zone for vegetation recovery in April or May with a planting density of 7 strains/$m^2$ for *Phragmitesaustralis* (Cav.) Trin. exSteud and 5 strains/$m^2$ for *Thaliadealbata* Link. The cover degree of the emergent aquatic plant on the newly built gentle slope will reach 72% in the next year.

The plane layout structure diagram and sectional layout structure diagram of the riparian zone constructed according to the above method are shown in FIGS. 25 and 26 respectively.

Figure 10:
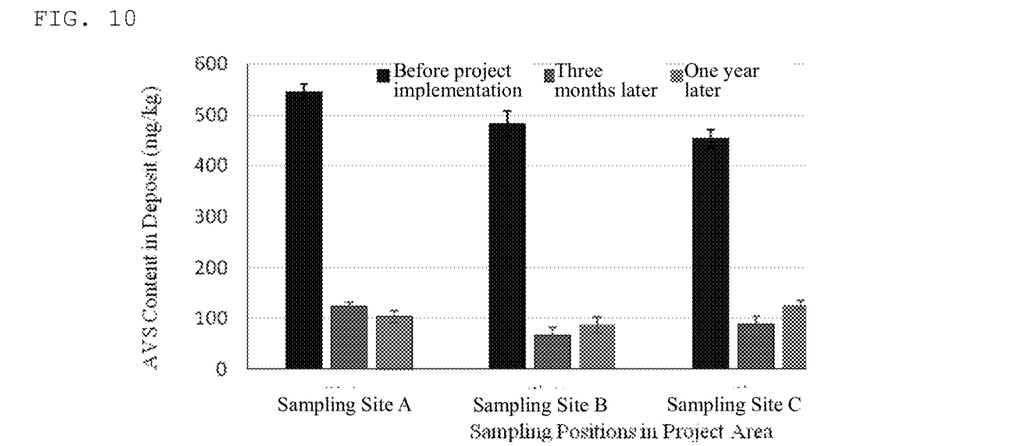
FIG. 10 is a dynamic schematic diagram of the sulfide in the sludge before and after the ecological remediation works of black and odorous sludge of Embodiment 4 is implemented.
Figure 11:
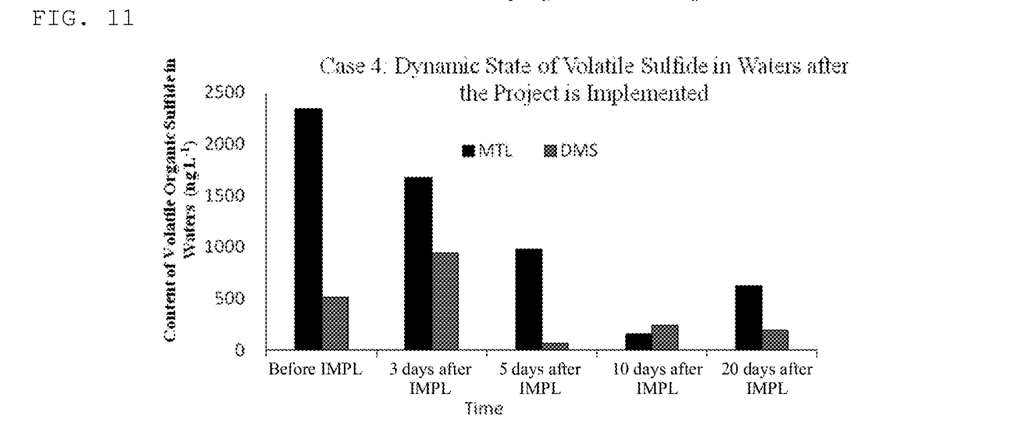
FIG. 11 is a dynamic schematic diagram of the volatile sulfide in the waters after the works of Embodiment 4 is implemented.
Figure 12:
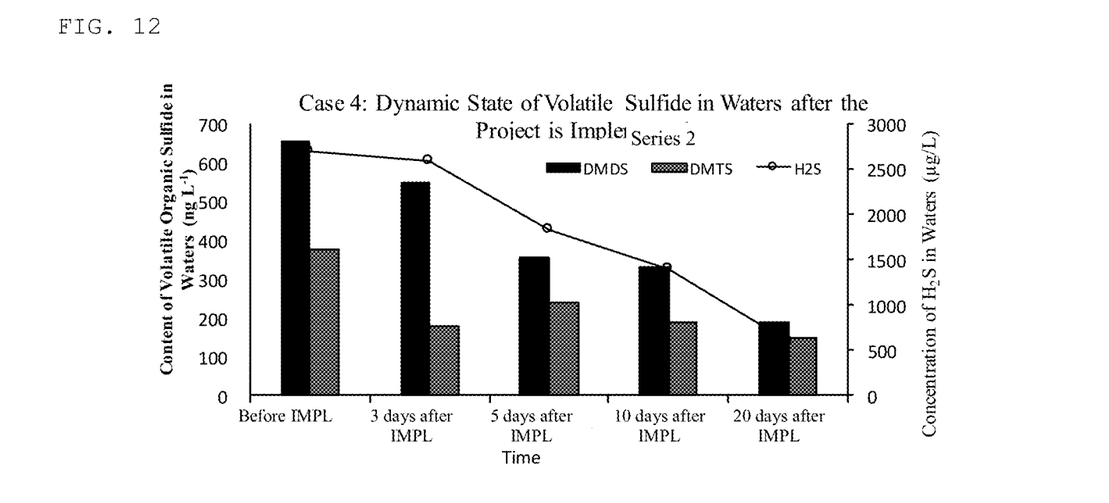
FIG. 12 is a dynamic schematic diagram of the volatile sulfide in the waters after the works of Embodiment 4 is implemented.

As shown in FIGS. 10-12, through continuous monitoring of the sulfide in the sludge after completion of the ecological project, the content of acid volatile sulfide (AVS) is found declined obviously. Three months later, the content of AVS in the sludge is declined by 77-86% (81% on average) compared with the contrast area; one year later, the content of AVS in the sludge is declined by 72-82% (78% on average) compared with the contrast area. The removal rate of volatile sulfides in the waters as dimethyl sulfide (DMS), dimethyl disulfide (DMDS), dimethyl trisulfide (DMTS), methanthiol (MTL) and hydrogen sulfide ($H_2S$) is 61-78%. The stink of water is eliminated effectively and the water quality is greatly improved.

Embodiment 5

A certain river in Haining, Zhejiang, of which the thickness of black and odorous sludge is about 30 cm on average, is conducted with ecological remediation according the Invention. The embodiment is as follows:

1) Sludge dredging. To dredge the contaminated deposit of the river, firstly, measure the vertical distribution characteristics on profile of the sulfide in the surficial deposit; analyze the release of sulphur for rating and ensure that the optimal depth for sludge ploughing in the middle sedimentation area of the riverbed is 20 cm based on the technical principle of hierarchical control of sulfide and the tenet of analyzing comprehensive cost-effectiveness and sulfide pollution as per classification. Then, stack the dredged contaminated sludge on both sides of the river with a dredger; the stacking width along the riparian zone is 15% of the total width of river bank. with the stacked sludge in a natural sloping proportion of 1:3 and peg cedar piles along the extension of the stacked sludge for slope protection. Peg 6-7 cedar piles with a top diameter of 9 cm and a rhizome of 15 cm one after another per meter for slope protection. The buried depth of the pile is 2.5 m. The top of the pile is flat with the normal water level of the river. The basal elevation of the stacked gentle slope is controlled within 1 m of the water depth.

2) Pre-treatment of gentle slope sludge. Solarization of the gentle slope sludge will be conducted for 8 days in total. Plough the surficial sludge of 20 cm depth 48 h after solarization for the first time and repeat ploughing at an interval of 24 h then. Add a compound ameliorant for deposit into the sludge during the first ploughing. The ameliorant is a mixer of slaked lime and iron-ore slag. Smash the mixture and use the particles of 100 meshes. The mass ratio of the compound ameliorant added into the deposit is 1000:10:20 of sludge deposit:slaked lime:smashed iron-ore slag. Because the content of sulfide in the deposit will be different among different areas of the river, the adding amount will be adjusted accordingly for the deposit with different properties.

3) Recover the emergent aquatic plant community on the surficial sludge after pre-treatment. Plant the subterraneous stem or balled seedling of *Typhaorientalis* Presl. and *Thaliadealbata* Link along the riparian zone for vegetation recovery in April or May with a planting density of 5 strains/$m^2$ for *Typhaorientalis* Presl. and 3 strains/$m^2$ for *Thaliadealbata* Link. The cover degree of the emergent aquatic plant on the newly built gentle slope will reach 79% in the next year.

The plane layout structure diagram and sectional layout structure diagram of the riparian zone constructed according to the above method are shown in FIGS. 25 and 26 respectively.

Figure 13:
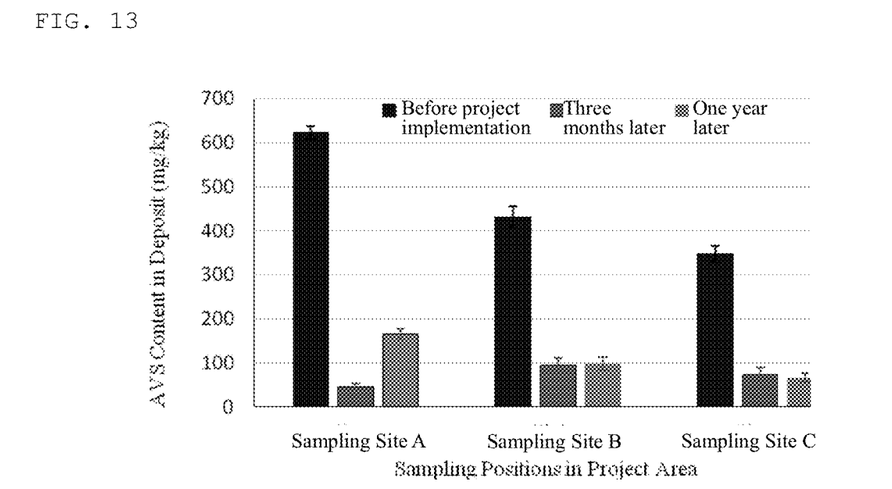
FIG. 13 is a dynamic schematic diagram of the sulfide in the sludge before and after the ecological remediation works of black and odorous sludge of Embodiment 5 is implemented.
Figure 14:
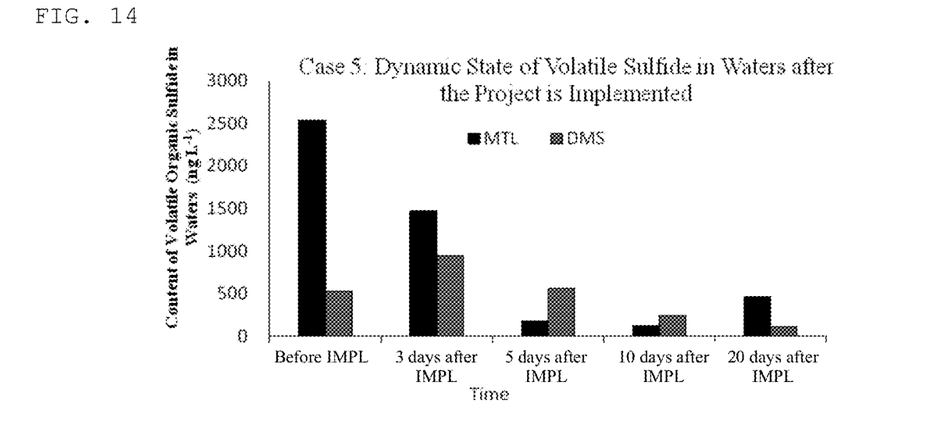
FIG. 14 is a dynamic schematic diagram of the volatile sulfide in the waters after the works of Embodiment 5 is implemented.
Figure 15:
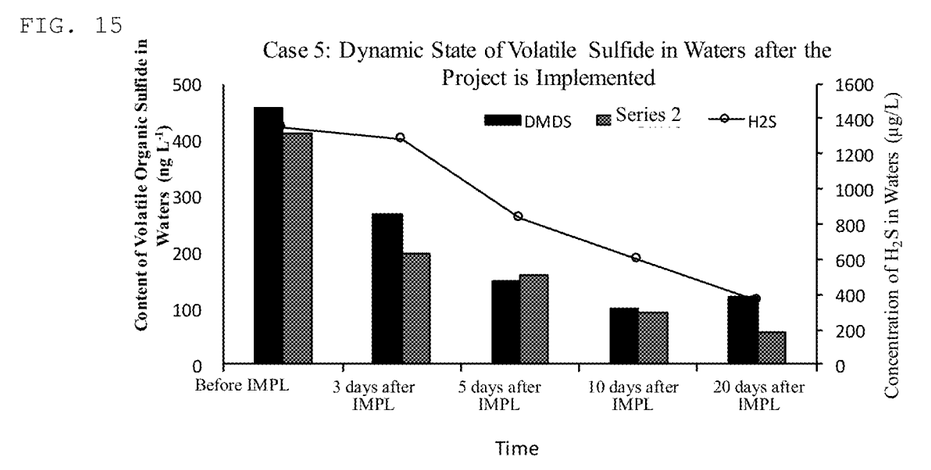
FIG. 15 is a dynamic schematic diagram of the volatile sulfide in the waters after the works of Embodiment 5 is implemented.

As shown in FIGS. 13-15, through continuous monitoring of the sulfide in the sludge after completion of the ecological project, the content of acid volatile sulfide (AVS) is found declined obviously. Three months later, the content of AVS in the sludge is declined by 77-93% (83% on average) compared with the contrast area; one year later, the content of AVS in the sludge is declined by 73-80% (77% on average) compared with the contrast area. The removal rate of volatile sulfides in the waters as dimethyl sulfide (DMS), dimethyl disulfide (DMDS), dimethyl trisulfide (DMTS), methanthiol (MTL) and hydrogen sulfide ($H_2S$) is 73-86%. The stink of water is eliminated and the water quality is greatly improved.

Embodiment 6

A certain river in Ningbo, Zhejiang, of which the thickness of black and odorous sludge is about 30 cm on average, is conducted with ecological remediation according to the Invention. The embodiment is as follows:

1) Sludge dredging. To dredge the contaminated deposit of the river, firstly, measure the vertical distribution characteristics on profile of the sulfide in the surficial deposit; analyze the release of sulphur for rating and ensure that the optimal depth for sludge ploughing in the middle sedimentation area of the riverbed is 20 cm based on the technical principle of hierarchical control of sulfide and the tenet of analyzing comprehensive cost-effectiveness and sulfide pollution as per classification. Then, stack the dredged contaminated sludge on both sides of the river with a dredger; the stacking width along the riparian zone is 15% of the total width of river bank. with the stacked sludge in a natural sloping proportion of 1:3 and peg cedar piles along the extension of the stacked sludge for slope protection. Peg 6-7 cedar piles with a top diameter of 9 cm and a rhizome of 15 cm one after another per meter for slope protection. The buried depth of the pile is 2.5 m. The top of the pile is flat with the normal water level of the river. The basal elevation of the stacked gentle slope is controlled within 1 m of the water depth.

2) Pre-treatment of gentle slope sludge. Solarization of the gentle slope sludge will be conducted for 8 days in total. Plough the surficial sludge of 20 cm depth 48 h after solarization for the first time and repeat ploughing at an interval of 24 h then. Add a compound ameliorant for deposit into the sludge during the first ploughing. The ameliorant is a mixer of slaked lime and iron-ore slag. Smash the mixture and use the particles of 100 meshes. The mass ratio of the compound ameliorant added into the deposit is 1000:15:35 of sludge deposit:slaked lime:smashed iron-ore slag.

Because the content of sulfide in the deposit will be different among different areas of the river, the adding amount will be adjusted accordingly for the deposit with different properties.

3) Recover the emergent aquatic plant community on the surficial sludge after pre-treatment. Plant the subterraneous stem or balled seedling of *Typhaorientalis* Presl. and *Thaliadealbata* Link along the riparian zone for vegetation recovery in April or May with a planting density of 5 strains/$m^2$ for *Typhaorientalis* Presl. and 3 strains/$m^2$ for *Thaliadealbata* Link. The cover degree of the emergent aquatic plant on the newly built gentle slope will reach 65% in the next year.

The plane layout structure diagram and sectional layout structure diagram of the riparian zone constructed according to the above method are shown in FIGS. 25 and 26 respectively.

Figure 16:
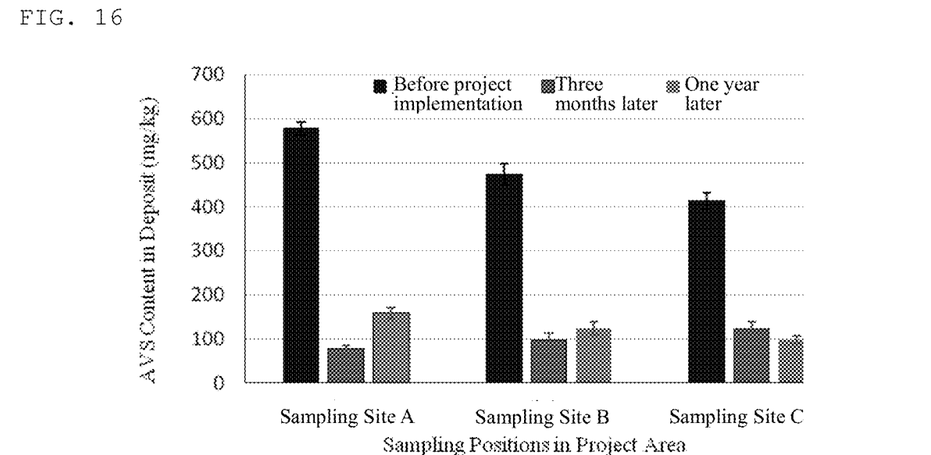
FIG. 16 is a dynamic schematic diagram of the sulfide in the sludge before and after the ecological remediation works of black and odorous sludge of Embodiment 6 is implemented.
Figure 17:
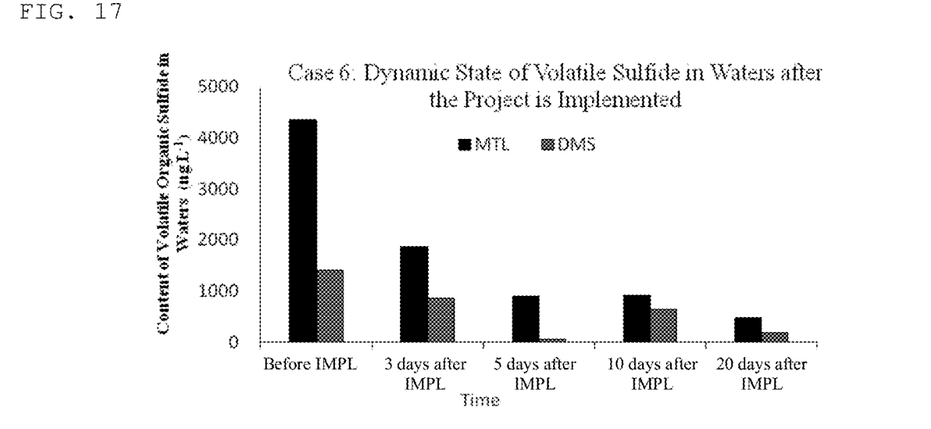
FIG. 17 is a dynamic schematic diagram of the volatile sulfide in the waters after the works of Embodiment 6 is implemented.
Figure 18:
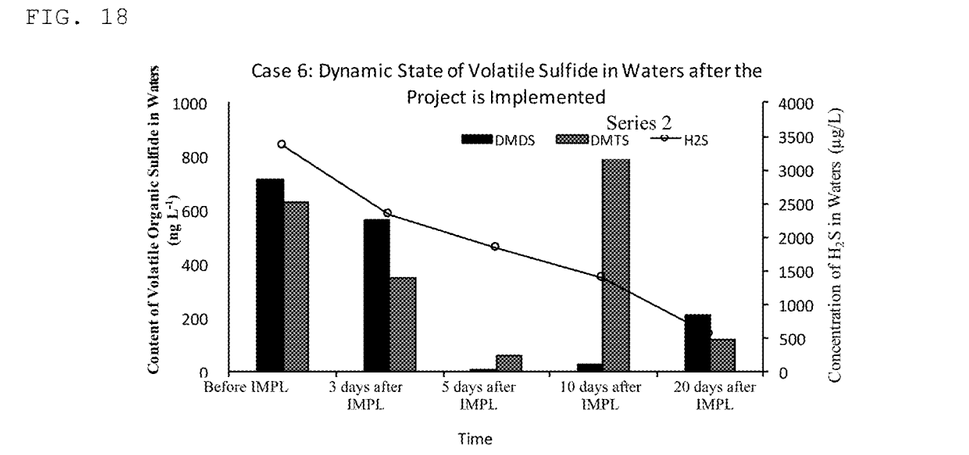
FIG. 18 is a dynamic schematic diagram of the volatile sulfide in the waters after the works of Embodiment 6 is implemented.

As shown in FIGS. 16-18, through continuous monitoring of the sulfide in the sludge after completion of the ecological project, the content of acid volatile sulfide (AVS) is found declined obviously. Three months later, the content of AVS in the sludge is declined by 70-86% (76% on average) compared with the contrast area; one year later, the content of AVS in the sludge is declined by 75-83% (79% on average) compared with the contrast area. The removal rate of volatile sulfides in the waters as dimethyl sulfide (DMS), dimethyl disulfide (DMDS), dimethyl trisulfide (DMTS), methanthiol (MTL) and hydrogen sulfide ($H_2S$) is 70-89%. The stink of water is basically eliminated and the water quality is greatly improved.

Embodiment 7

A certain river in Hangzhou, Zhejiang, of which the thickness of black and odorous sludge is about 30 cm on average, is conducted with ecological remediation according to the Invention. The embodiment is as follows:

1) Sludge dredging. To dredge the contaminated deposit of the river, firstly, measure the vertical distribution characteristics on profile of the sulfide in the surficial deposit; analyze the release of sulphur for rating and ensure that the optimal depth for sludge ploughing in the middle sedimentation area of the riverbed is 20 cm based on the technical principle of hierarchical control of sulfide and the tenet of analyzing comprehensive cost-effectiveness and sulfide pollution as per classification. Then, stack the dredged contaminated sludge on both sides of the river with a dredger; the stacking width along the riparian zone is 15% of the total width of river bank. with the stacked sludge in a natural sloping proportion of 1:3 and peg cedar piles along the extension of the stacked sludge for slope protection. Peg 6-7 cedar piles with a top diameter of 9 cm and a rhizome of 15 cm one after another per meter for slope protection. The buried depth of the pile is 2.5 m. The top of the pile is flat with the normal water level of the river. The basal elevation of the stacked gentle slope is controlled within 1 m of the water depth.

2) Pre-treatment of gentle slope sludge. Solarization of the gentle slope sludge will be conducted for 8 days in total. Plough the surficial sludge of 20 cm depth 48 h after solarization for the first time and repeat ploughing at an interval of 24 h then. Add a compound ameliorant for deposit into the sludge during the first ploughing. The ameliorant is a mixer of slaked lime and iron-ore slag. Smash the mixture and use the particles of 100 meshes. The mass ratio of the compound ameliorant added into the deposit is 1000:25:40 of sludge deposit:slaked lime:smashed iron-ore slag. Because the content of sulfide in the deposit will be different among different areas of the river, the adding amount will be adjusted accordingly for the deposit with different properties.

3) Recover the emergent aquatic plant community on the surficial sludge after pre-treatment. Plant the subterraneous stem or balled seedling of *Typhaorientalis* Presl. and *Thaliadealbata* Link along the riparian zone for vegetation recovery in April or May with a planting density of 3 strains/$m^2$ for *Typhaorientalis* Presl. and 5 strains/$m^2$ for *Thaliadealbata* Link. The cover degree of the emergent aquatic plant on the newly built gentle slope will reach 77% in the next year.

The plane layout structure diagram and sectional layout structure diagram of the riparian zone constructed according to the above method are shown in FIGS. 25 and 26 respectively.

Figure 19:
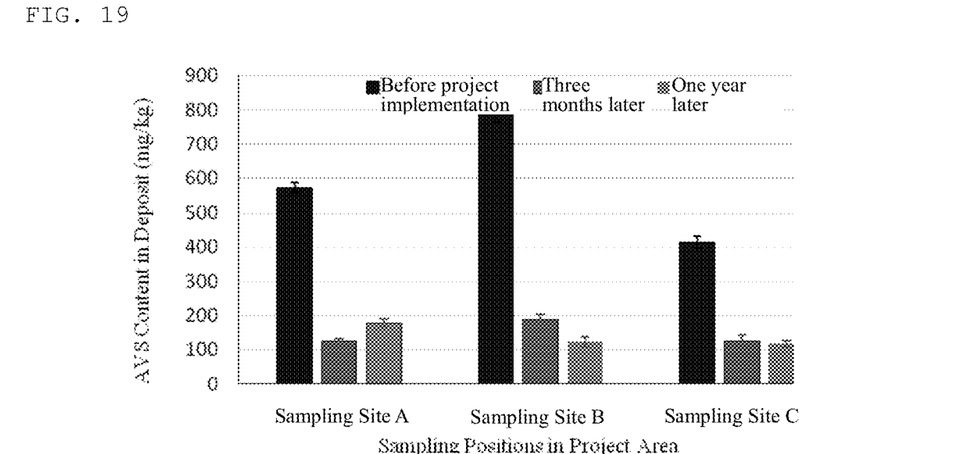
FIG. 19 is a dynamic schematic diagram of the sulfide in the sludge before and after the ecological remediation works of black and odorous sludge of Embodiment 7 is implemented.
Figure 20:
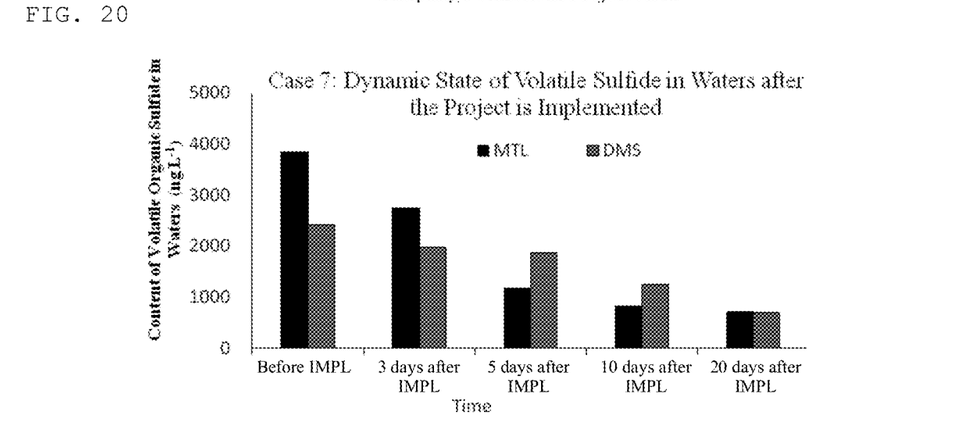
FIG. 20 is a dynamic schematic diagram of the volatile sulfide in the waters after the works of Embodiment 7 is implemented.
Figure 21:
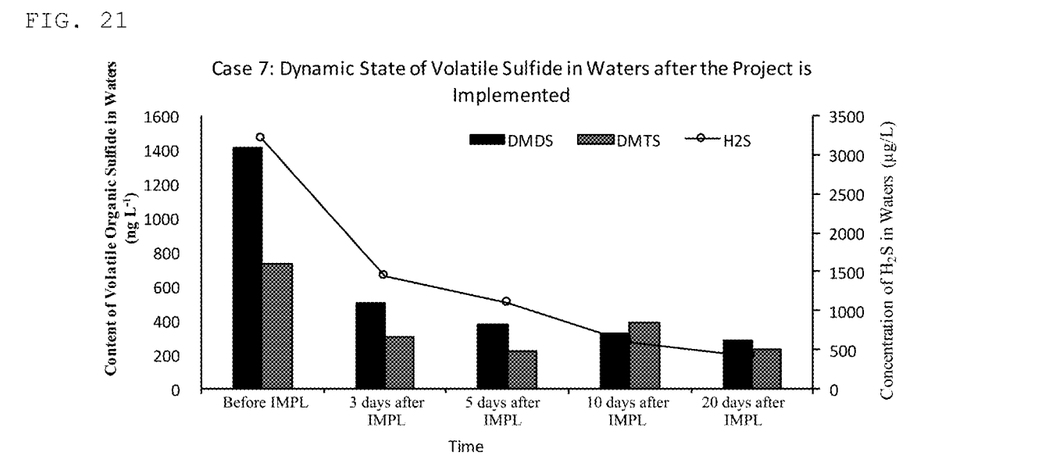
FIG. 21 is a dynamic schematic diagram of the volatile sulfide in the waters after the works of Embodiment 7 is implemented.

As shown in FIGS. 19-21, through continuous monitoring of the sulfide in the sludge after completion of the ecological project, the content of acid volatile sulfide (AVS) is found declined obviously. Three months later, the content of AVS in the sludge is declined by 69-78% (75% on average) compared with the contrast area; one year later, the content of AVS in the sludge is declined by 68-84% (75% on average) compared with the contrast area. The removal rate of volatile sulfides in the waters as dimethyl sulfide (DMS), dimethyl disulfide (DMDS), dimethyl trisulfide (DMTS), methanthiol (MTL) and hydrogen sulfide ($H_2S$) is 68-87%. The stink of water is eliminated and the water quality is greatly improved.

Embodiment 8

A certain river in Wuxi, Jiangsu, of which the thickness of black and odorous sludge is about 35 cm on average, is conducted with ecological remediation according the Invention. The embodiment is as follows:

1) Sludge dredging. To dredge the contaminated deposit of the river, firstly, measure the vertical distribution characteristics on profile of the sulfide in the surficial deposit; analyze the release of sulphur for rating and ensure that the optimal depth for sludge ploughing in the middle sedimentation area of the riverbed is 35 cm based on the technical principle of hierarchical control of sulfide and the tenet of analyzing comprehensive cost-effectiveness and sulfide pollution as per classification. Then, stack the dredged contaminated sludge on both sides of the river with a dredger; the stacking width along the riparian zone is 15% of the total width of river bank. with the stacked sludge in a natural sloping proportion of 1:3 and peg cedar piles along the extension of the stacked sludge for slope protection. Peg 6-7 cedar piles with a top diameter of 9 cm and a rhizome of 15 cm one after another per meter for slope protection. The buried depth of the pile is 2.5 m. The top of the pile is flat with the normal water level of the river. The basal elevation of the stacked gentle slope is controlled within 1 m of the water depth.

2) Pre-treatment of gentle slope sludge. Solarization of the gentle slope sludge will be conducted for 8 days in total. Plough the surficial sludge of 35 cm depth 48 h after solarization for the first time and repeat ploughing at an interval of 24 h then. Add a compound ameliorant for deposit into the sludge during the first ploughing. The ameliorant is a mixer of slaked lime and iron-ore slag. Smash the mixture and use the particles of 100 meshes. The mass ratio of the compound ameliorant added into the deposit is 1000:25:50 of sludge deposit:slaked lime:smashed iron-ore slag. Because the content of sulfide in the deposit will be different among different areas of the river, the adding amount will be adjusted accordingly for the deposit with different properties.

3) Recover the emergent aquatic plant community on the surficial sludge after pre-treatment. Plant the subterraneous stem or balled seedling of *Typhaorientalis* Presl. and *Thaliadealbata* Link along the riparian zone for vegetation recovery in April or May with a planting density of 4 strains/$m^2$ for *Typhaorientalis* Presl. and 5 strains/$m^2$ for *Thaliadealbata* Link. The cover degree of the emergent aquatic plant on the newly built gentle slope will reach 82% in the next year.

The plane layout structure diagram and sectional layout structure diagram of the riparian zone constructed according to the above method are shown in FIGS. 25 and 26 respectively.

Figure 22:
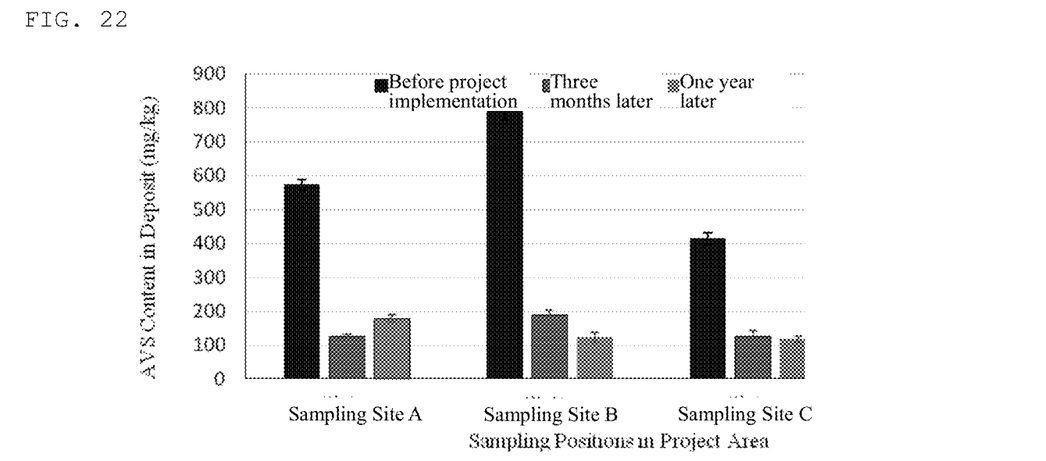
FIG. 22 is a dynamic schematic diagram of the sulfide in the sludge before and after the ecological remediation works of black and odorous sludge of Embodiment 8 is implemented.
Figure 23:
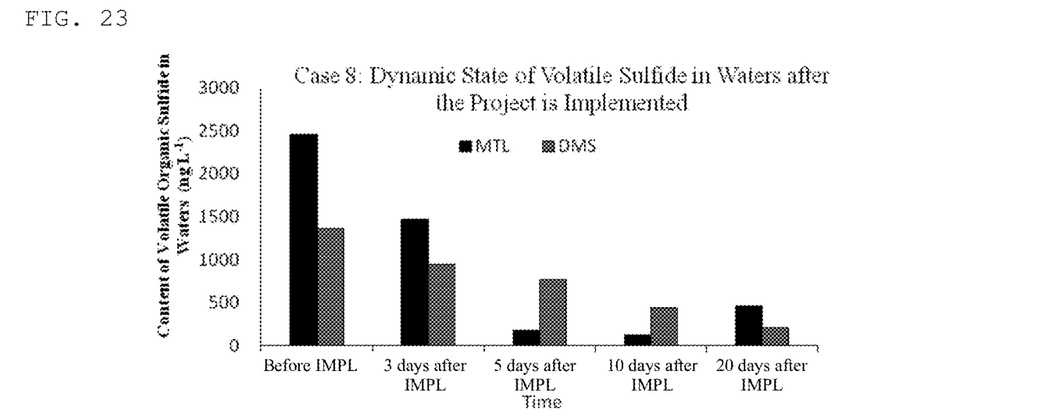
FIG. 23 is a dynamic schematic diagram of the volatile sulfide in the waters after the works of Embodiment 8 is implemented.
Figure 24:
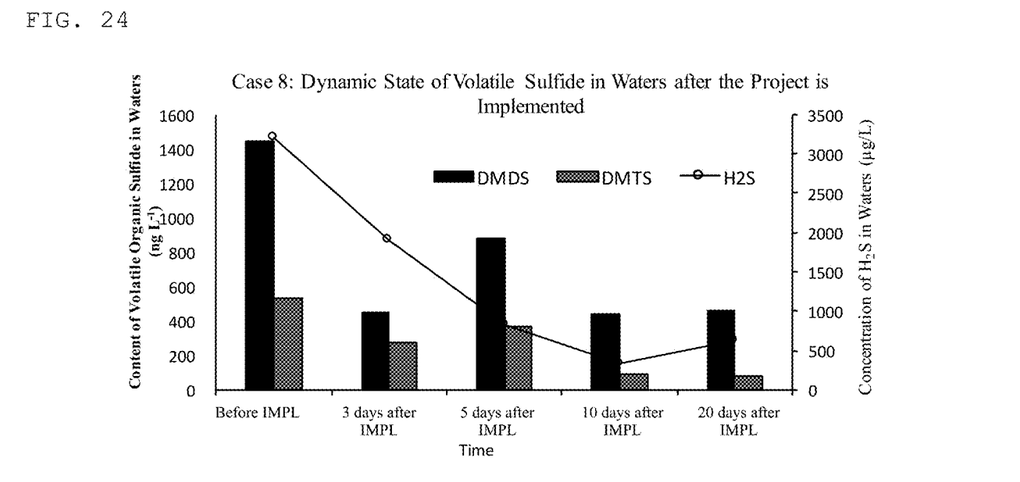
FIG. 24 is a dynamic schematic diagram of the volatile sulfide in the waters after the works of Embodiment 8 is implemented.

As shown in FIGS. 22-24, through continuous monitoring of the sulfide in the sludge after completion of the ecological project, the content of acid volatile sulfide (AVS) is found declined obviously. Three months later, the content of AVS in the sludge is declined by 69-78% (75% on average) compared with the contrast area; one year later, the content of AVS in the sludge is declined by 68-84% (75% on average) compared with the contrast area. The removal rate of volatile sulfides in the waters as dimethyl sulfide (DMS), dimethyl disulfide (DMDS), dimethyl trisulfide (DMTS), methanthiol (MTL) and hydrogen sulfide ($H_2S$) is 68-84%. The stink of water is basically eliminated and the water quality is greatly improved.

What is claimed is:

1. An ecological remediation method for controlling sulphur pollution in black and odorous sludge of rivers, wherein, said method comprises the following steps:

Step 1: Determining an optimal dredging depth of the black and odorous sludge in the middle of a riverbed of the river; dredging a contaminated sludge and stacking it on both banksides of the river; building a slope with slope protection and slope toe reinforcement along a riparian zone; wherein the slope with the stacked sludge is built in a proportion of 1:3-1:5 with respect to a natural sloping of the river;

Step 2: Pre-treatment of the contaminated sludge on the slope of the banksides: stacking the sludge on the banksides for solarization and plowing the surface layer of the sludge during said pre-treatment; spraying a compound ameliorant into the sludge during plowing; said compound ameliorant is a mixture of slaked lime and iron-ore slag;

Step 3: Planting an aquatic vascular plant community on the banksides after pre-treatment of the contaminated sludge on the slope.

2. The ecological remediation method according to claim 1, wherein, said Step 1 of determining the dredging depth of the sludge is to determine the sludge plowing depthi based on a technical principle combining a release rate of nitrogen and phosphorus from the sludge and hierarchical control of heavy metal pollution; and Step 1 further comprises:

Firstly, collecting an in-situ sludge with a columnar sludge sampler of gravity type dividing the columnar sludge into several layers from the surficial deposit to the bottom to obtain the vertical distribution information of the pollutants in the sludge, ranking risks for a sulfide content in different soil layers of the surficial deposit and a sulfide emission flux level of a sludge-aqueous interface, and determining the optimal dredging depth of the sludge based on a technical principle of hierarchical control of sulphur pollution in the sludge.

3. The ecological remediation method according to claim 1, wherein, as for dredging a contaminated sludge and stacking it on both banksides of the river as described in Step 1, the stacking width of the sludge along the riparian zone is 10-20% of the total river width.

4. The ecological remediation method according to claim 1, wherein, as for building the slope with slope protection and slope toe reinforcement along the riparian zone as described in Step 1, the slope toe reinforcement is to reinforce the slope toe along an extension of the stacked sludge with timber piles; said piles are cedar piles of 5 m long with a rhizome of 12-15 cm and a top diameter of 8-10 cm, which are pegged one after another; the upper end of the cedar piles is 1-2.5 m higher than the basal elevation of the extension slope toe of the newly stacked slope; the top of the piles is flat with the normal water level of the river; the basal elevation of the stacked slope will be controlled within 1.2 m of the water depth.

5. The ecological remediation method according to claim 1, wherein, the time for solarization as described in Step 2 is 5-10 days.

6. The ecological remediation method according to claim 1, wherein, plowing the surface layer of the sludge as described in Step 2 is conducted for 2-3 times with a plowing depth of more than 20 cm.

7. The ecological remediation method according to claim 6, wherein, the plowing is conducted 48 h after solarization for the first time and repeated at an interval of 24 h then.

8. The ecological remediation method for controlling sulphur pollution in black and odorous sludge of rivers according to claim 1, wherein, the time for adding the compound ameliorant mixed with slaked lime and iron-ore slag as described in Step 2 is 48 h after solarization; said compound ameliorant is a powder of 20-100 meshes; the mass ratio of the compound ameliorant added into a deposit is 1000:0.2-25:0.5-50 of sludge deposit:slaked lime: smashed iron-ore slag; the ameliorant is added for many times with a small amount each time so that it can be uniformly mixed with the sludge.

9. The ecological remediation method according to claim 1, wherein, the mass ratio of the compound ameliorant added into a deposit is 1000:0.2-0.8:10-35 of sludge deposit: slaked lime:smashed iron-ore slag.

10. The ecological remediation method according to claim 1, wherein, the aquatic vascular plant community as described in Step 3 comprises *Phragmitesaustralis* (Can) Trim. exSteud, *Typhaorientalis* Presl. and *Thaliadealbata* Link; the planting density of *Phragmitesaustralis* (Can) Trin. exSteud is 5-8 strains/m2, *Typhaorientalis* Presl. 3-5 strains/m2 and *Thaliadealbata* Link 3-5 strains/m2, which finally forms the aquatic plant community with a vegetation fraction of more than 60%.

11. The ecological remediation method according to claim 8, wherein, the mass ratio of the compound ameliorant added into the deposit is 1000:0.2-0.8:10-35 of sludge deposit:slaked lime:smashed iron-ore slag.

* * * * *